M. L. MERY.
Weighing-Scoops.

No. 196,245. Patented Oct. 16, 1877.

Witnesses
Geo. H. Strong.
Frank A. Brooks.

Inventor
M. L. Mery
By his Attys
Dewey & Co.

UNITED STATES PATENT OFFICE.

MICHAEL L. MERY, OF CHICO, CALIFORNIA.

IMPROVEMENT IN WEIGHING-SCOOPS.

Specification forming part of Letters Patent No. 196,245, dated October 16, 1877; application filed August 24, 1877.

*To all whom it may concern:*

Be it known that I, MICHAEL L. MERY, of the town of Chico, county of Butte, and State of California, have invented a Weighing-Scoop; and I do hereby declare the following to be a full, clear, and exact description thereof, reference being had to the accompanying drawings.

My invention relates to a novel combination scoop and weighing device; and it consists in constructing a scoop in combination with a spring-balance, located in the scoop-handle, with scale and pointers on the handle, and a stop so arranged as to save the spiral balance-spring from damage when the scoop is thrust into any hard unyielding material.

It also relates to certain anti-frictional devices and a balance adjustment, as will be more fully described by reference to the accompanying drawings, in which—

Figure 1:
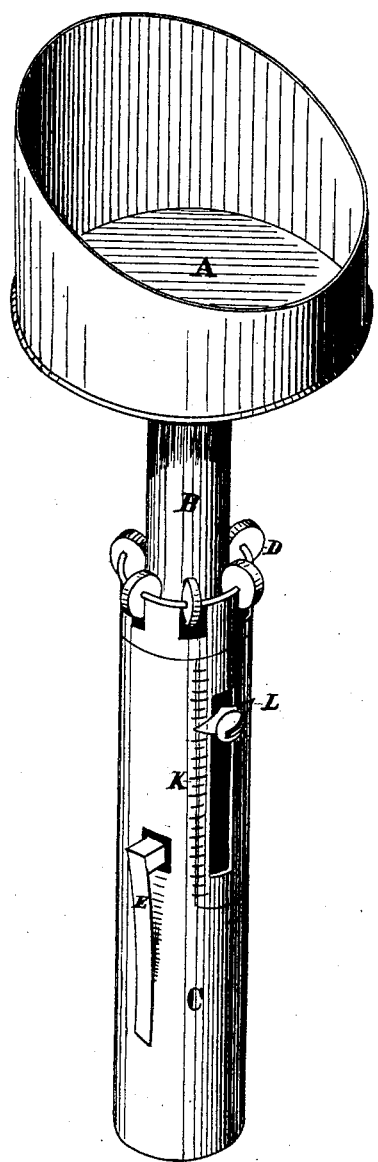
Figure 2:
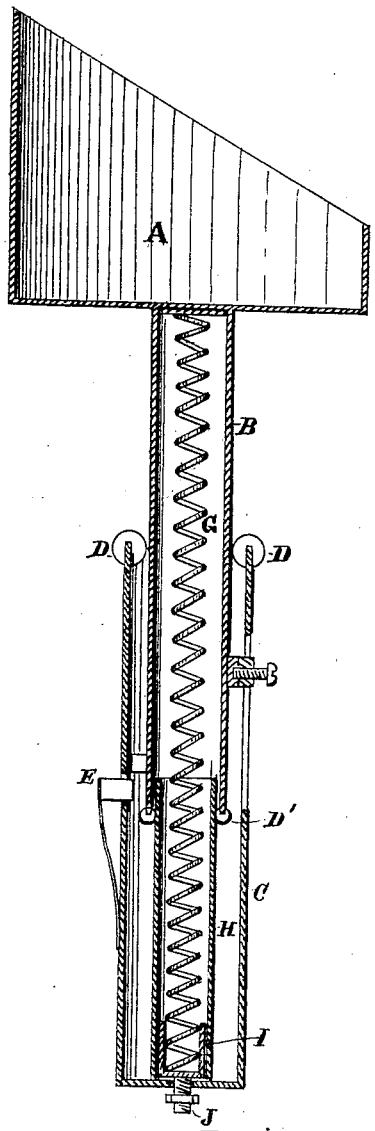

Figure 1 is a perspective view. Fig. 2 is a vertical section.

The scoop A has its movable stem B sliding in the handle C, and outside the spring-case H, as shown. The guides or rollers D serve to keep the stem in position, so that the spring may work free; also to prevent friction while weighing. A similar set of anti-friction rollers, D', are fixed to the lower end of the stem, so as to work between the outer and inner case C and H.

A spring-stop, E, is so arranged on the handle as to be directly under the thumb when the handle is grasped, and a slight pressure of the thumb on it when the scoop is thrust in any material prevents the stem B from being pressed back.

A spiral balance-spring, G, plays within a socket or case, H, which fits inside the stem B, and is made fast to the inside lower end of the handle.

A thimble, I, placed in the lower end of socket H, holds the end of the spring G, and a nut and screw, J, in the end of handle C, operate upon this thimble, and serve to adjust the tension of the spring. This screw J can be made hook-shaped, and can be used to hang the scoop by when not in use.

A scale, K, is fixed on the handle, and is graduated on both sides of a double pointer, L—one side to ounces, the other to quarter-pounds or any other desired scale.

When the scoop is in use, the handle is naturally grasped so that the thumb is directly over the stop E, and a slight pressure on it when the scoop is thrust into any material prevents the stem from being pushed down upon the spring and causing any damage to it. The combination of handle and stem is made stiff and unyielding by reason of this stop, thus facilitating the scooping up of any hard, unyielding material.

When the material to be weighed is raised up in the scoop, the stop is released, and the balance being free to act, the weight of the material will show on the scale.

This arrangement of scoop and scale gives two useful articles in one, and is very serviceable where a large amount of material has to be divided by weight into small quantities.

Having thus described my invention, what I claim as new, and desire to secure by Letters Patent, is—

1. The scoop A, with its hollow stem B fitted to slide between the outer and inner handle and case C H, and provided with the anti-friction rollers D D', in combination with the spring G and scale K, substantially as herein described.

2. The scoop A, with its stem B and hollow double handle and spring-case C H, in combination with the thimble or socket I and screw J, for adjusting and regulating the spring G, substantially as herein described.

3. The scoop A, with its stem B moving in the handle C, and provided with the balance-spring and scale, in combination with the spring-stop E, to prevent the movement of the stem B, substantially as herein described.

In witness whereof I have hereunto set my hand and seal.

MICHAEL L. MERY. [L. S.]

Witnesses:
 THOMAS MORRIN,
 LEMUEL FLETCHER.